United States Patent
Rajan et al.

(10) Patent No.: US 8,131,961 B2
(45) Date of Patent: Mar. 6, 2012

(54) RELIABLE STORAGE OF DATA IN A DISTRIBUTED STORAGE SYSTEM

(75) Inventors: Govinda Nallappa Rajan, Huizen (NL); Rob C J Smets, Utrecht (NL); Jeroen Wellen, Leusden (NL)

(73) Assignee: Alcatel Lucent, Paris (FR)

( * ) Notice: Subject to any disclaimer, the term of this patent is extended or adjusted under 35 U.S.C. 154(b) by 465 days.

(21) Appl. No.: 12/316,284

(22) Filed: Dec. 11, 2008

(65) Prior Publication Data

US 2009/0157991 A1    Jun. 18, 2009

(30) Foreign Application Priority Data

Dec. 18, 2007  (EP) .................................. 07123521

(51) Int. Cl.
*G06F 12/00* (2006.01)
(52) U.S. Cl. .. 711/162; 711/114; 711/161; 711/E12.103
(58) Field of Classification Search .................... 711/162
See application file for complete search history.

(56) References Cited

U.S. PATENT DOCUMENTS

| 7,000,141 | B1 | | 2/2006 | Karlsson et al. | |
| 7,580,956 | B1 | * | 8/2009 | Xin et al. ............................... | 1/1 |
| 2003/0074161 | A1 | | 4/2003 | Smocha et al. | |
| 2004/0257985 | A1 | | 12/2004 | Sahai et al. | |
| 2005/0071436 | A1 | | 3/2005 | Hsu et al. | |
| 2005/0268057 | A1 | * | 12/2005 | Satoyama et al. ............. | 711/162 |
| 2006/0182107 | A1 | * | 8/2006 | Frank et al. ................... | 370/389 |
| 2006/0271734 | A1 | * | 11/2006 | Strange et al. ................ | 711/114 |
| 2007/0050543 | A1 | * | 3/2007 | Pomerantz ..................... | 711/114 |
| 2008/0107037 | A1 | * | 5/2008 | Forbes et al. ................. | 370/242 |

FOREIGN PATENT DOCUMENTS

WO  WO 2006/036812  4/2006

OTHER PUBLICATIONS

McCue, D.L. et al; Computing Replica Placement in Distributed Systems; Management of Replicated Data; Second Workshop on the Monterey, CA; Nov. 12-13, 1992; pp. 58-61; IEEE Comput. Soc., Los Alamitos, CA, USA.

Rahman, Rashedur M. et al; Study of Different Replica Placement and Maintenance Strategies in Data Grid; Cluster Computing and the Grid; May 1, 2007; pp. 171-178; Seventh IEEE International Symposium ON, IEEE, PI.

* cited by examiner

*Primary Examiner* — Reginald Bragdon
*Assistant Examiner* — Gurtej Bansal
(74) *Attorney, Agent, or Firm* — Carmen Patti Law Group, LLC

(57) ABSTRACT

The present invention relates to the reliable storage of data within a distributed storage system. A method and system for storing a data unit within a distributed storage system is disclosed, wherein the distributed storage system comprises a plurality of storage elements of unspecified system reliability, a public network interconnecting the plurality of storage elements and a reliability index control unit measuring a plurality of storage element reliability indexes associated with the plurality of storage elements. The data unit is stored following the steps of receiving a request to store the data unit according to a data unit reliability index and storing replicated copies of the data unit in at least one storage element, such that the data unit reliability index is achieved.

9 Claims, 2 Drawing Sheets

RELIABLE STORAGE OF DATA IN A DISTRIBUTED STORAGE SYSTEM

Figure 1:
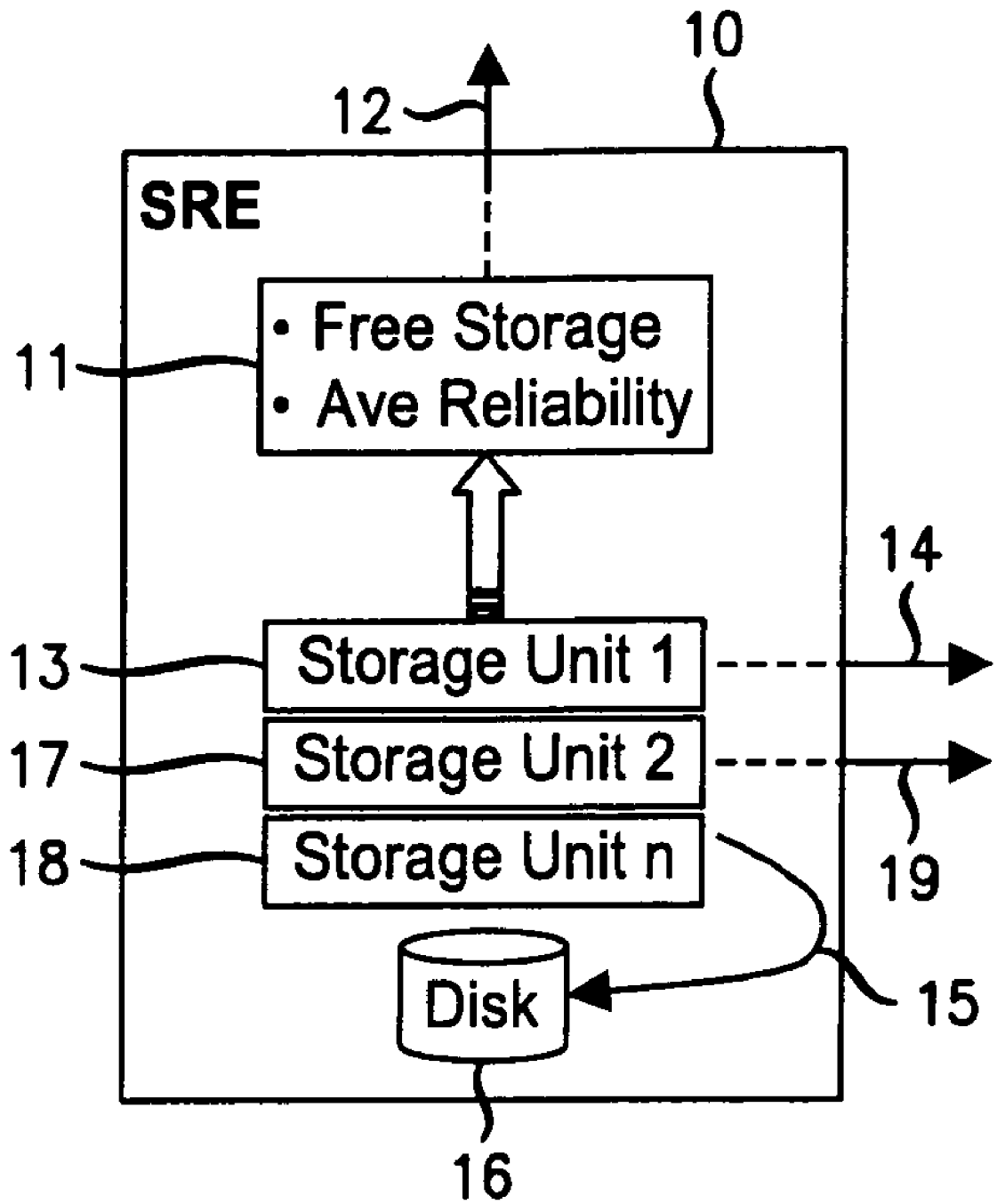

The present invention relates to the reliable storage of data within a distributed storage system.

In order to provide reliable storage of data, many systems have been proposed in the prior art. Such systems differ in many aspects, with respect to storage medium, such as tapes, disks, flash memory, etc., or technical features, such as access speed, portability, storage size, re-write capabilities and reliability. Notably, reliability is a key functionality and storage systems use different approaches to achieve such reliability.

A well know approach is Redundant Array of Independent Drives (RAID). RAID is an umbrella term for computer data storage schemes that divide and replicate data among multiple hard disk drives. RAID's various designs balance or accentuate two key design goals: increased data reliability and increased I/O (input/output) performance. A number of standard schemes have evolved which are referred to as RAID levels. RAID combines physical hard disks into a single logical unit by using either special hardware or software. Hardware solutions often are designed to present themselves to an attached system as a single hard drive, and the operating system is unaware of the technical workings. Software solutions are typically implemented in the operating system and again would present the RAID drive as a single storage device to applications. There are three key concepts in RAID: mirroring, the copying of data to more than one disk; striping, the splitting of data across more than one disk; and error checking, where redundant data is stored to allow problems to be detected and possibly fixed (known as fault tolerance). Different RAID levels use one or more of these techniques, depending on the system requirements. The main aims of using RAID are to improve reliability and speed. The components such as disk drives of a RAID system are traditionally placed within one location.

For increased reliability and notably for disaster recovery, distributed storage systems have been introduced, such as storage area networks (SAN) or network-attached storage (NAS). SAN is an architecture to attach remote computer storage devices, e.g. disk arrays, tape libraries and optical jukeboxes, to servers in such a way that, to the operating system, the devices appear to be locally attached. SANs normally utilize a fiber channel fabric topology, which is an infrastructure specially designed to handle storage communications and which assures fast and reliable access to the storage media. Furthermore, SANs usually interconnect large high-availability disk arrays. Consequently, SANs are a rather complex technology used within large enterprises and are mainly used for the storage and backup of entire disk blocks.

An alternative option to SANs is network-attached storage (NAS) which uses file-based protocols such as network file system (NFS) and which is used to allow computer networks to access remote storage elements. In contrary to SANs, it is known to users within NAS that the storage is remote. Furthermore, the granularity of accessible data units is much smaller and computers may request portions of a file rather than entire disk blocks.

The storage systems known from the prior art are normally designed from predefined system components, such as disk drives with specified specifications, and are interconnected via dedicated networks, such as fiber channel fabrics in case of SANs. Furthermore, the storage systems are normally designed and built to fulfill pre-defined specifications. Apart from fault correction mechanisms, such systems are mainly static in that the configuration of storage systems is not changed continuously during operation. In addition, prior art systems do not use reliability factors, but just replicate data units into multiple copies for storage in distributed resources. The disadvantage of not having indications of the probability of availability of a data unit is that more storage resources are used than necessary. This is caused by the fact, that in order to guarantee a desired reliability of a data unit, the number of replicated copies tend to be higher, if no knowledge of the reliability of the storage elements is available. Furthermore, it is not possible to make efficient use of storage resources depending upon the degree of reliability needed for different types of data to be stored. Some data units may have a higher degree of necessary reliability than others.

Furthermore, prior art systems normally define reliability as a pure result of failures in equipment and power and generally estimate reliability using common Mean Time between Failures (MTBF) analyses. Such reliability estimation methods do not apply when using terminals/storage equipment which is placed in homes and/or small/medium enterprises (SME) premises, such as personal computers, digital video recorders, with physical storage devices, such as hard disks, flash disks, and others, as storage equipments. The reliability of such storage equipment is not satisfactorily described by the methods known from the prior art, as they do not take into account usage patterns, such as the manual switch off of a personal computer. In such cases, the MTBF values of the storage equipment do not give a correct picture of the actual availability of the storage equipment. Therefore, it may be said that such storage elements have no specified system reliability.

The present invention relates to building a reliable storage system comprising a dynamically changing plurality of storage elements, each having unspecified system reliability.

According to an aspect of the invention, a distributed storage system for storage of a data unit is disclosed. The distributed storage system comprises a plurality of storage elements of unspecified system reliability. By way of example, such storage elements may be a multitude of relatively less reliable residence equipments and/or terminals such as resident gateways, home computers and other terminals with extra unused storage capacity. Furthermore, the plurality of storage elements is interconnected via a public network. By way of example, such public networks could be the access network of a fixed network operator or the internet. The network may comprise home networking devices, such as WLAN routers, and residential or business access modems, such as DSL modems or optical ONTs (optical network terminals). Furthermore, the network may comprise access multiplexers at the operator side, such as DSLAMs or GPON OLTs (optical line terminals), as well as edge and core routers.

Furthermore, the distributed storage system comprises reliability index control means measuring a plurality of storage element reliability indexes associated with the plurality of storage elements. It may be beneficial to continuously monitor the storage element reliability indexes and/or to associate the storage element reliability indexes uniquely in a one to one relationship with the plurality of storage elements. In other words, a storage element reliability index may be assigned to each of the storage elements and continuously updated through measurements. By way of example, a storage element, such as the disk drive of an arbitrary home computer, has possibly no specification known to the overall storage system. Consequently, the storage system assigns a default storage element reliability index to this particular disk drive and measures the reliability of the disk drive. Such measurements may be performed continuously. It is to be noted that the reliability of a storage element may be influenced by many factors, as for example its specification, which may be unknown to the storage system, the habits of the owner of the storage element, the reliability of the part of the network connecting the storage element to the other storage elements, and others. By means of a reliability index control unit, a storage element reliability index which takes into account all these factors may be determined and continuously updated for the storage element. In more general terms, it may be beneficial to track the usage and availability pattern of a storage element. This means that a storage element reliability index, e.g, may be different at different times of a day and/or week and may reflect the usage pattern of the device owner.

Furthermore, the distributed storage system has means to receive a request to store a data unit according to a given or desired data unit reliability index. A data unit reliability index may be different for different data units and it may be predefined by the user of the distributed storage system separately for each data unit. Furthermore, in a similar manner as the storage unit reliability indexes, a data unit reliability index may also differ for different times during the day and/or week and thereby reflect the availability requirement of the user for the data unit. By way of example, a user of the distributed storage system may request that a particular file is stored with 99% reliability. In addition, the distributed storage system has means to store replicated copies of the data unit in at least one storage element, such that the desired data unit reliability index is achieved. Based on the storage elements which are available at a given time and based on their momentary storage element reliability index, the storage system stores a certain number of replicated copies of the data unit into selected storage elements. The number of required replicated copies and their exact storage locations is determined such that the data unit reliability index is achieved. By way of example, storing said file with 99% reliability may require storing said file within five different storage elements such that the combined storage element reliability index is meeting the desired data unit reliability index requirements.

As the number of storage elements available within the distributed storage system as well as their associated storage element reliability index may change continuously, the distributed storage system may have means to continuously monitor the evolution of the achieved data unit reliability index of said data unit and—if necessary—to change the storage pattern of the replicated copies of the data unit, such that the pre-defined data unit reliability index is achieved, preferably at all times.

According to another aspect of the invention, a reliable storage service is defined. The service may be offered by service providers to end-users or small and medium enterprises for storage and caching purposes. The reliable storage system may comprise a multitude of relatively unreliable residence equipment such as resident gateways, home computers and other terminals with extra storage capacity. By replicating the data units which are to be stored and by storing them in a distributed environment within a typical access network, reliability may be increased so that a desired reliability is achieved. From a reliability point of view, it may be beneficial to distribute replicated copies of a data unit as far apart from each other as possible, e.g. in separate parts of the network so that a network failure does not affect all of them.

A distributed storage system comprises a plurality of physical storage elements. These physical storage elements may be described on a logical level through a number of operating parameters, such as their reliability, their free storage space and a pointer indicating the location of the physical storage element. Some of the following aspects of the invention relate to a possible logical arrangement of the physical storage elements.

According to another aspect of the invention, the distributed storage system comprises on a logical level at least one standardized storage element referred to as Storage Resource Elements (SRE). Each SRE may have two types of external interfaces for resource discovery, one interface to a higher level SRE and interfaces to possible lower level SREs. The higher-level interface provides available free storage space within associated storage units, described below, and an overall reliability index of the SRE.

An SRE comprises at least one logical storage unit(s) which in total constitute the free storage space of an SRE. Each storage unit maintains a minimum of three information fields: a field indicating the free storage space of the storage unit, a reliability index of the storage unit and a label identifying the physical location of the storage unit, possibly an IP address of the physical storage element. If the label of the physical location is an IP address which is equal to the IP address of the local SRE, then the free storage indicated for the storage unit is available on a local device and/or physical storage element. Otherwise, the IP address points to the next SRE node. There may be more than one storage unit within one SRE and there may be a mixture of local and remote nodes for the storage units of one SRE.

According to another aspect of the invention, a reliability index is defined for each storage unit. This reliability index is referred to as storage unit reliability index and it may be updated continuously to reflect the current reliability of the related storage unit. For this purpose appropriate measures are defined and tracked. By way of example, the reliability index may be a number between 1 and 100, with 1 being the lowest reliability. When put into service, all storage units are initialized with 1, i.e. the lowest reliability. The reliability index of a particular storage unit may be increased by a count of $N_1$, possibly 1, for about $M_1$, possibly 100, storage transactions in which a particular storage unit participated within a given time period. On the other hand, the reliability index may be decreased by a count of $N_2$, possibly 1, if the number of storage transactions in that given time period is less than $M_2$, possibly 100. This allows to monitor the dynamic reliability of the storage unit.

According to another aspect of the invention, the storage unit reliability indexes may depend on specific time periods, such as time within a day and/or day of a week. By way of example, a time period, e.g. 24 hours, may be divided into sub-time units, such as 00:00-06:00 hours, 06:00-09:00 hours, 09:00-12:00 hours and so on. A storage element reliability index may be defined for each sub-time unit and it may be updated as per availability of the storage unit within that sub-time unit. This way, the probability of availability of a storage unit is reflected for each time-period under consideration. In more general terms, the storage element reliability index may reflect the usage and/or availability pattern of the storage element or the logically associated storage unit. Such a pattern may take into account certain time periods of a day, such as business hours and off-business hours, or certain periods of a week, such as weekdays and weekends, and other particular events, such as public holidays and others. A different storage element reliability index may be determined for each of those time periods, in order to obtain a preferably complete picture of the usage and/or availability pattern of the storage element. This information may be used when storing data units associated with a data unit reliability index by selecting appropriate storage element(s). It may be beneficial to define similar patterns also for the accessibility requirements of a data unit. A user may request availability of a data unit during business hours or only on weekends and/or public holidays. This data unit availability requirement may be reflected by defining a data unit reliability index with different values associated with different time periods. Consequently, when storing a data unit the distributed storage system may take into account both the availability patterns of the storage elements, expressed by the storage element reliability indexes, and the availability requirement of the data unit, expressed by the data unit reliability index.

According to another aspect of the invention, a storage resource manager (SRM) is defined as a set of hierarchical SREs. As each SRE has one interface to a higher level and multiple interfaces to lower levels, they may be easily arranged into an hierarchical tree structure, referred to as SRM. Each SRE in the tree structure may comprise multiple storage units some of which refer to local storage devices while others refer to other remote SREs on a lower level. The remote SREs in turn refer to local storage units and/or to other SREs until the last SREs on the lowest tree levels only comprise local storage devices or storage elements. Note, that it is possible to have only one SRE within a SRM.

According to another aspect of the invention, the purpose of the SRM is to confine the external interfaces of the storage service to external users to a small set of SREs. Furthermore, the definition of an SRM should help to increase the reliability of the overall storage service, notably by the replication of stored data units.

It should be noted that basically the above mentioned aspects of the invention may be combined in many useful ways. Furthermore, it should be noted that the disclosure of the invention also covers other claim combinations than the claim combinations which are explicitly given by the back references in the dependent claims, i.e., the claims may be basically combined in any order.

The advantages and features of the invention will become apparent from the description of preferred embodiments. The present invention is described in the following by referring to exemplary embodiments illustrated schematically in the accompanying figures, wherein FIG. 1 illustrates an embodiment of a standard storage element (SRE); and FIG. 2 illustrates an embodiment of a storage resource manager (SRM).

Figure 2:
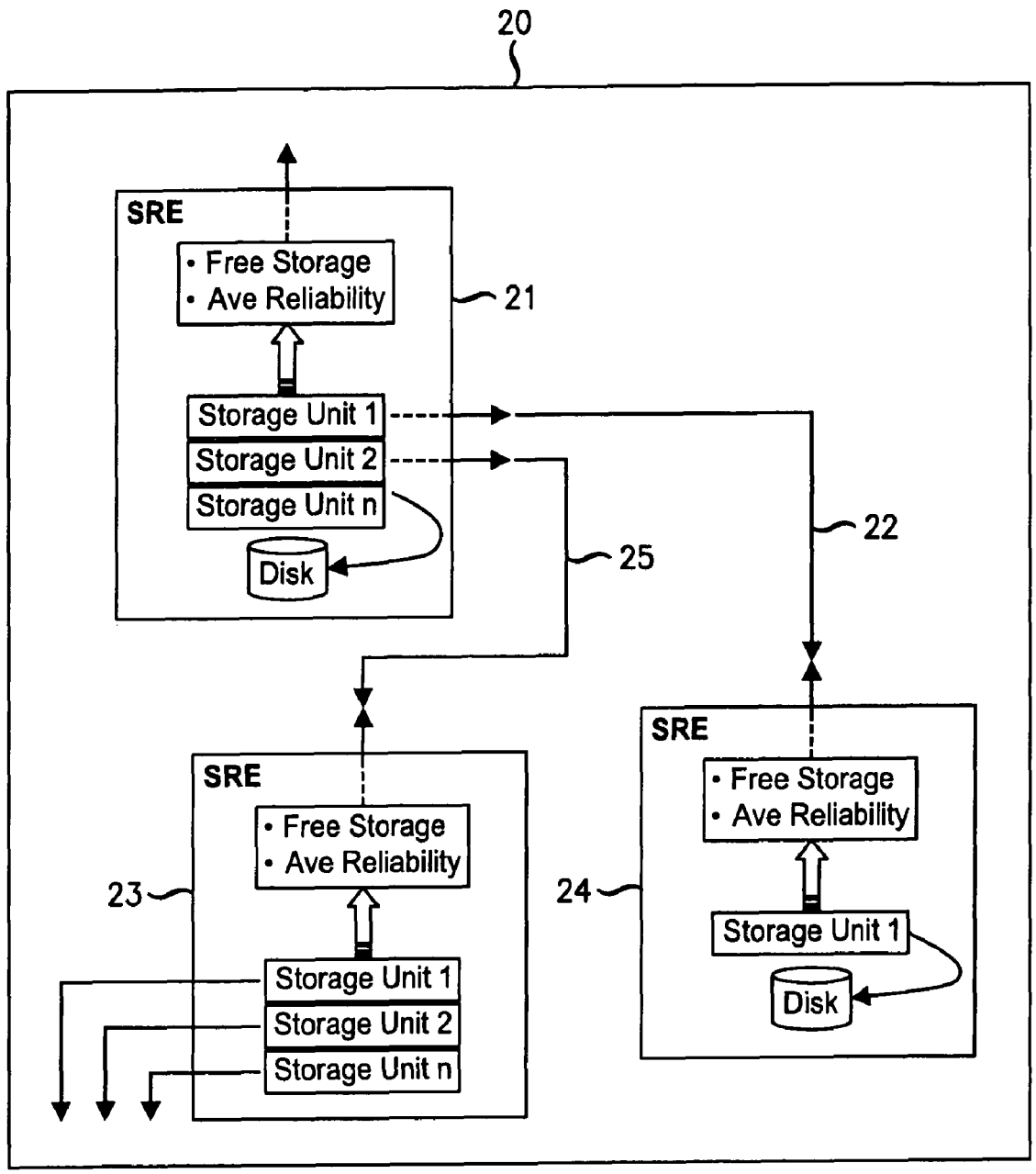

FIG. 1 shows an embodiment of a standard storage element 10 comprising an upper interface 12 possibly towards higher level SREs. The information 11 available at this interface comprises the cumulative free storage space made available by this SRE and the average reliability of this free storage space. This information is deduced from the information available from the storage units 13, 17, 18, which are part of the standard storage element 10. Each storage unit comprises at least three fields, i.e. the available free storage space, the storage unit reliability index and at least one pointer 14, 15, 19 that points to the physical storage location. This physical storage location may be remote 14, 19, e.g. within another SRE, or local 15, e.g. within a disk drive 16, which is part of the local SRE. The pointers may be implemented as IP addresses, associated with the physical storage devices.

There are different ways of calculating the overall free storage space and the average reliability index of an SRE, based on the information available from the storage units. One possibility is to calculate the total free storage space of the SRE as the sum of the free storage space of the storage units of the SRE. In a similar manner, the average SRE reliability index may be calculated as the weighted average of the storage unit reliability indexes of the SRE, wherein the free storage space of the respective storage unit is used as weight. Alternatively, the SRE reliability index may be the lowest storage unit reliability index of the storage units associated with the SRE.

It should also be noted that there a multiple ways of calculating the reliability index of a storage unit. By way of example, the reliability index may be a function of the number of successful transactions performed within a given time period. Preferably a high number of successful transactions would indicate a higher reliability than a lower number of successful transactions. Such transactions may be test transactions, which continuously or sporadically test the availability of a storage unit, or regular data access operations. It should also be noted that it may be beneficial to associate multiple reliability indexes with a storage unit, e.g. in order to reflect different user/usage patterns at different times of a day or a week. In more general terms, it may be beneficial to describe each storage unit with a preferably complete user and availability pattern. This may be beneficial, as the reliability of a storage unit which may be the hard disk on a personal computer connected via an ADSL line may not only depend on the technical reliability of the hard disk itself, but also on the actual usage of the owner of the personal computer, who might turn off his or her personal computer at certain times of a day (e.g. from 10 p.m. to 8 a.m.).

As explained above, it may be beneficial to track a storage element reliability index for different periods of a day and/or week in order to obtain a meaningful availability pattern of a storage element. At the same time, it may be beneficial to define different values for a data unit reliability index for different periods of a day in order to reflect preferably specific availability requirements for a data unit. A distributed storage system may make use of such information and may fulfill the availability requirements of a data unit by selecting storage elements with availability patterns, i.e. storage element reliability indexes, which best match the availability requirements, i.e. the data unit reliability index, of the data unit. This matching process may also be used to minimize the overall used up storage space within the distributed storage system.

FIG. 2 illustrates an embodiment of a storage resource manager 20 comprising an upper SRE 21 and two lower level SREs 23, 24. The upper SRE 21 comprises a plurality of storage units, with storage unit 1 and 2 pointing to SREs 24 and 23 using the pointers 22 and 25, respectively. While SRE 23 comprises a plurality of storage units which point to further lower level SREs, SRE 24 does not point to further external SREs. In the illustrated case, SRE 24 only comprises one storage unit, which points to a physical storage location that is local to SRE 24.

In an embodiment a storage processing device is used in order to store a data unit according to a requested data unit reliability index within the distributed storage system. Such a storage processing device may gather information with respect to the reliability and the available storage space within the distributed storage system. For storing a data unit within the system it has different possibilities. In one embodiment, the free storage space and reliability indexes of all storage units may be known to the storage processing device. In such a case, the storage processing device would select a certain number of adequate storage devices for storing replicated copies of the data unit, such that the overall reliability for retrieving at least one copy of the data unit is greater than the requested data unit reliability index. The selection of the appropriate storage units may depend on possible matching activities between the usage patterns of the storage units and the availability requirements of the data unit and is done according to methods known to the person skilled in the art.

In another embodiment, the storage processing device may only know the information provided by one or more storage resource managers. In such cases, the storage processing device would select one or more SRMs which overall fulfill the reliability requirements according to the requested data unit reliability index and requests the storage of the data unit within the one or more SRMs such that the desired data unit reliability index is achieved. A processing element associated with the SRM will then determine how to store the data element within the SRM tree, e.g. which SRE is selected and how many replications of the data unit are to be stored.

It should be noted that due to changing topology and/or reliability situations inherent in the described distributed storage network, it may be required to constantly monitor the actual reliability for a particular data unit. If the actual reliability drops below the requested data unit reliability index, the storage processing device may need to repeat the storage activities described above, in order to reestablish the requested reliability situation. That is, the storage processing device may need to select additional and/or other storage devices and it may need to store therein additional replicated copies of the data unit.

A method and a system for storing data units within a distributed storage environment comprising a plurality of storage elements with unspecified system reliability and interconnected via a public network has been disclosed. By defining a storage element reliability index which continuously tracks the reliability of a storage element, a distributed storage system can be built which allows the storage of data units according to a pre-defined reliability. A method for estimating the reliability of the storage elements, irrespective of whether the unavailability of the storage element is due to an element failure or a deliberate turning off of the storage device, is disclosed.

This written description uses examples to disclose the invention, including the best mode, and also to enable any person skilled in the art to make and use the invention. While the invention has been described in terms of various specific embodiments, those skilled in the art will recognise that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. A distributed storage system for storage of a data unit, comprising:
   a plurality of storage elements of unspecified system reliability;
   a public network interconnecting the plurality of storage elements;
   reliability index control continuously measuring a plurality of storage element reliability indexes which are associated with the plurality of storage elements and take into account the reliability of the plurality of storage elements and the reliability of the part of the public network connecting the plurality of storage elements;
   storage processing device for receiving a request to store the data unit according to a data unit availability index, reflecting an availability requirement of a user for the data unit, and for continuously monitoring data unit availability indices of stored data subject to changes in the plurality of storage element reliability indexes; and
   processing element for storing replicated copies of the data unit in at least one storage element, such that the data unit availability index is achieved;
   wherein the reliability index control calculates the storage element reliability indexes by being configured to:
   initialize the storage element reliability index of a new storage element with a default reliability index;
   increase the storage element reliability index by a first pre-defined value, if the storage element has participated in a first pre-defined number of successful storage transactions within a given time period; and
   decrease the storage element reliability index by a second pre-defined value, if the storage element has not participated in a second pre-defined number of successful storage transactions within a given time period.

2. The distributed storage system according to claim 1, wherein
   the processing element assures that the data unit availability index is achieved at all times.

3. The distributed storage system according to claim 1, wherein the storage elements of unspecified reliability comprise storage devices in at least one of personal computers, home gateways and video recorders.

4. The distributed storage system according to claim 1, wherein the storage element reliability indexes are tracked independently for different time-periods.

5. The distributed storage system according to claim 1, wherein the plurality of storage elements is organized in a hierarchical tree structure.

6. The distributed storage system according to claim 5, wherein the plurality of storage elements are organized using a logical structure of standard storage elements (SRE) (10), each SRE comprising
   an upper interface (12) indicating an overall free storage space and an average reliability of the SRE;
   at least one storage unit (13, 18) further comprising at least three fields: a free storage space, a reliability index of the at least one storage unit and at least one pointer (14, 15) pointing from the storage unit (13, 18) to a lower level SRE (10) or to a physical storage element (16).

7. The distributed storage system according to claim 6, wherein the pointers are IP addresses associated with the physical storage element (16).

8. A method for storing a data unit within a distributed storage system comprising
   a plurality of storage elements of unspecified system reliability; and
   a public network interconnecting the plurality of storage elements;
   wherein the method comprises the steps of:
   determining a plurality of storage element reliability indexes which are associated with the plurality of storage elements and take into account the reliability of the plurality of storage elements and the reliability of the part of the public network connecting the plurality of storage elements;
   receiving a request to store the data unit according to a data unit availability index, wherein the data unit availability index reflects an availability requirement of a user for the data unit; and
   storing replicated copies of the data unit in at least one storage element, such that the data unit availability index is achieved;
   continuously monitoring the storage element reliability indexes and the data unit availability indexes so as to maintain the availability requirement of a user for a data unit subject to changes in the plurality of storage element reliability indexes;

wherein the storage element reliability indexes are determined by:
initializing the storage element reliability index of a new storage element with a default reliability index;
increasing the storage element reliability index by a first pre-defined value, if the storage element has participated in a first pre-defined number of successful storage transactions within a given time period; and
decreasing the storage element reliability index by a second pre-defined value, if the storage element has not participated in a second pre-defined number of successful storage transactions within a given time period.

9. The method according to claim 8, wherein
the received request comprises the data unit availability index associated with the data unit; and
the storing step comprises the steps of:
retrieving the plurality of storage element reliability indexes; and
selecting at least one storage element for the storage of a replicated copy of the data unit, such that the combined storage element reliability index of the at least one storage element fulfills the requirements according to the data unit availability index.

\* \* \* \* \*